US010542255B2

(12) United States Patent
Alakuijala et al.

(10) Patent No.: US 10,542,255 B2
(45) Date of Patent: Jan. 21, 2020

(54) IMAGE PROCESSING FOR COMPRESSION

(71) Applicant: GOOGLE INC., Mountain View, CA (US)

(72) Inventors: Jyrki Alakuijala, Wollerau (CH); Robert Obryk, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 63 days.

(21) Appl. No.: 15/718,107

(22) Filed: Sep. 28, 2017

(65) Prior Publication Data

US 2019/0098302 A1 Mar. 28, 2019

(51) Int. Cl.
| | |
|---|---|
| *H04N 19/117* | (2014.01) |
| *H04N 19/126* | (2014.01) |
| *H04N 19/167* | (2014.01) |
| *H04N 19/176* | (2014.01) |
| *H04N 19/172* | (2014.01) |
| *H04N 19/154* | (2014.01) |
| *H04N 19/86* | (2014.01) |
| *H04N 19/124* | (2014.01) |
| *H04N 19/80* | (2014.01) |
| *H04N 19/46* | (2014.01) |

(Continued)

(52) U.S. Cl.
CPC ......... *H04N 19/117* (2014.11); *H04N 19/124* (2014.11); *H04N 19/126* (2014.11); *H04N 19/134* (2014.11); *H04N 19/154* (2014.11); *H04N 19/167* (2014.11); *H04N 19/172* (2014.11); *H04N 19/176* (2014.11); *H04N 19/46* (2014.11); *H04N 19/80* (2014.11); *H04N 19/86* (2014.11); *H04N 19/513* (2014.11); *H04N 19/82* (2014.11)

(58) Field of Classification Search
CPC ....................................................... G06T 1/00
USPC ................................................. 375/239–241
See application file for complete search history.

(56) References Cited

U.S. PATENT DOCUMENTS

| 8,780,971 B1 * | 7/2014 | Bankoski | ............. | H04N 19/147 |
| | | | | 375/240 |
| 2003/0053708 A1 * | 3/2003 | Kryukov | ................ | H04N 19/86 |
| | | | | 382/261 |

(Continued)

FOREIGN PATENT DOCUMENTS

| EP | 1840875 A1 | 10/2007 |
| WO | 2011/081637 A1 | 7/2011 |

OTHER PUBLICATIONS

Bankoski, et al., "Technical Overview of VP8, An Open Source Video Codec for the Web", Jul. 11, 2011, 6 pp.

(Continued)

*Primary Examiner* — Anand S Rao
(74) *Attorney, Agent, or Firm* — Young Basile Hanlon & MacFarlane, P.C.

(57) ABSTRACT

Systems and methods are disclosed for coding images. For example, methods may include: receiving an encoded bitstream that was generated at least in part by applying a sharpening filter to an input image to obtain a sharpened image and applying a blockwise encoder to the sharpened image; decoding, using a blockwise decoder, data from an encoded bitstream to obtain a plurality of blocks of image data; combining the plurality of blocks of image data to form a blocked image; and applying a blurring filter, which is matched to the sharpening filter, to the blocked image to obtain an output image.

20 Claims, 13 Drawing Sheets

(51) Int. Cl.
*H04N 19/134* (2014.01)
*H04N 19/82* (2014.01)
*H04N 19/513* (2014.01)

(56) References Cited

U.S. PATENT DOCUMENTS

2012/0257679 A1 10/2012 Bankoski et al.
2012/0294543 A1* 11/2012 Sen .................. H04N 19/63
382/233

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Anonymous, "Smoothing & Sharpening Functions", ImagesPlus Image Processing Concepts & User Manual, Dec. 2, 2015, Retrieved from URL: http://www.ml unsold.com/process/IP6/manual/SmoothSharpenTools.pdf (retrieved Aug. 10, 2018), 47 pgs.
Anonymous, "ImagesPlus 6.5 x64 & 6.0 x32 Processing Tutorials", (proof of publication date of Anonymous, "Smoothing & Sharpening Functions"), retrieved from URL: http://www.mlunsold.eom/ILProcessing.html [retrieved Aug. 10, 2018], 8 pgs.
K. Konstantinides et al., "Image Sharpening in the JPEG Domain", IEEE Transactions on Image Processing, vol. No. 6, Jun. 1, 1999, pp. 874-878.
A. Rossholm et al., "Low-complex adaptive post filter for enhancement of coded video", 9th International Symposium on Signal Processing and its Applications (ISSPA 2007), IEEE, Feb. 12, 2007, 4 pgs.
International Search Report and Wrtiten Opinion in PCT/US2018/036311, dated Oct. 15, 2018, 20 pgs.

* cited by examiner

| 0.0004809093 | 0.0050111902 | 0.0109454458 | 0.0050111902 | 0.0004809093 |
|---|---|---|---|---|
| 0.0050111902 | 0.0522178013 | 0.1140541639 | 0.0522178013 | 0.0050111902 |
| 0.0109454458 | 0.1140541639 | 0.2491171972 | 0.1140541639 | 0.0109454458 |
| 0.0050111902 | 0.0522178013 | 0.1140541639 | 0.0522178013 | 0.0050111902 |
| 0.0004809093 | 0.0050111902 | 0.0109454458 | 0.0050111902 | 0.0004809093 |

| | | | | | | | | |
|---|---|---|---|---|---|---|---|---|
| 0.009550<br>454 | -0.043080<br>2434 | 0.104913<br>2248 | -0.235371<br>3665 | 0.431232<br>8209 | -0.235371<br>2903 | 0.104913<br>2082 | -0.043080<br>2917 | 0.009550<br>506 |
| -0.043080<br>3492 | 0.147451<br>2381 | -0.362776<br>3758 | 0.794488<br>5298 | -1.464074<br>327 | 0.794488<br>5948 | -0.362776<br>402 | 0.147451<br>1888 | -0.043080<br>2941 |
| 0.104913<br>1749 | -0.362776<br>4045 | 0.892159<br>6695 | -1.955841<br>706 | 3.603315<br>584 | -1.955841<br>695 | 0.892159<br>6597 | -0.362776<br>4129 | 0.104913<br>1964 |
| -0.235371<br>2729 | 0.794488<br>5368 | -1.955841<br>726 | 4.277338<br>639 | -7.884922<br>207 | 4.277338<br>593 | -1.955841<br>702 | 0.794488<br>5793 | -0.235371<br>3098 |
| 0.431232<br>8842 | -1.464074<br>391 | 3.603315<br>546 | -7.884922<br>136 | 14.53314<br>093 | -7.884922<br>213 | 3.603315<br>587 | -1.464074<br>329 | 0.431232<br>8015 |
| -0.235371<br>3134 | 0.794488<br>492 | -1.955841<br>723 | 4.277338<br>696 | -7.884922<br>146 | 4.277338<br>631 | -1.955841<br>69 | 0.794488<br>5395 | -0.235371<br>3877 |
| 0.104913<br>219 | -0.362776<br>3859 | 0.892159<br>673 | -1.955841<br>714 | 3.603315<br>541 | -1.955841<br>732 | 0.892159<br>6872 | -0.362776<br>3661 | 0.104913<br>1998 |
| -0.043080<br>2865 | 0.147451<br>2605 | -0.362776<br>386 | 0.794488<br>5042 | -1.464074<br>391 | 0.794488<br>5284 | -0.362776<br>3931 | 0.147451<br>2483 | -0.043080<br>2595 |
| 0.009550<br>4217 | -0.043080<br>306 | 0.104913<br>2 | -0.235371<br>3176 | 0.431232<br>8763 | -0.235371<br>2842 | 0.104913<br>1812 | -0.043080<br>3356 | 0.009550<br>4538 |

1050

| 0.0014180537 | 0.0090352819 | 0.0167503822 | 0.0090352819 | 0.0014180537 |
|---|---|---|---|---|
| 0.0090352819 | 0.0575692733 | 0.1067268671 | 0.0575692733 | 0.0090352819 |
| 0.0167503822 | 0.1067268671 | 0.1978594396 | 0.1067268671 | 0.0167503822 |
| 0.0090352819 | 0.0575692733 | 0.1067268671 | 0.0575692733 | 0.0090352819 |
| 0.0014180537 | 0.0090352819 | 0.0167503822 | 0.0090352819 | 0.0014180537 |

IMAGE PROCESSING FOR COMPRESSION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and reference frames to reconstruct the frames or images.

SUMMARY

This application relates to encoding and decoding an image. Disclosed herein are aspects of systems, methods, and apparatuses for encoding and decoding an image using matched sharpening and blurring filters.

One aspect of the disclosed implementations is a system for decoding images. The system includes a memory and a processor. The memory stores instructions executable by the processor to cause the system to: receive an encoded bitstream that was generated at least in part by applying a sharpening filter to an input image to obtain a sharpened image and applying a blockwise encoder to the sharpened image; decode, using a blockwise decoder, data from an encoded bitstream to obtain a plurality of blocks of image data; combine the plurality of blocks of image data to form a blocked image; and apply a blurring filter, which is matched to the sharpening filter, to the blocked image to obtain an output image.

Another aspect is a method for decoding images. The method includes: receiving an encoded bitstream that was generated at least in part by applying a sharpening filter to an input image to obtain a sharpened image and applying a blockwise encoder to the sharpened image; decoding, using a blockwise decoder, data from an encoded bitstream to obtain a plurality of blocks of image data; combining the plurality of blocks of image data to form a blocked image; and applying a blurring filter, which is matched to the sharpening filter, to the blocked image to obtain an output image.

Another aspect is a system for encoding images. The system includes a memory and a processor. The memory stores instructions executable by the processor to cause the system to: apply a sharpening filter to an input image to obtain a sharpened image, wherein the sharpening filter is matched to a blurring filter; encode, using a blockwise encoder, the sharpened image to generate data of an encoded bitstream; and encode an indication of the blurring filter in the encoded bitstream.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 10A is an example of an array of coefficients of a blurring filter.

FIG. 10B is an example of an array of coefficients of a sharpening filter.

FIG. 11A is an example of an array of coefficients of a blurring filter.

FIG. 11B is an example of an array of coefficients of a sharpening filter.

DETAILED DESCRIPTION

Figure 1:
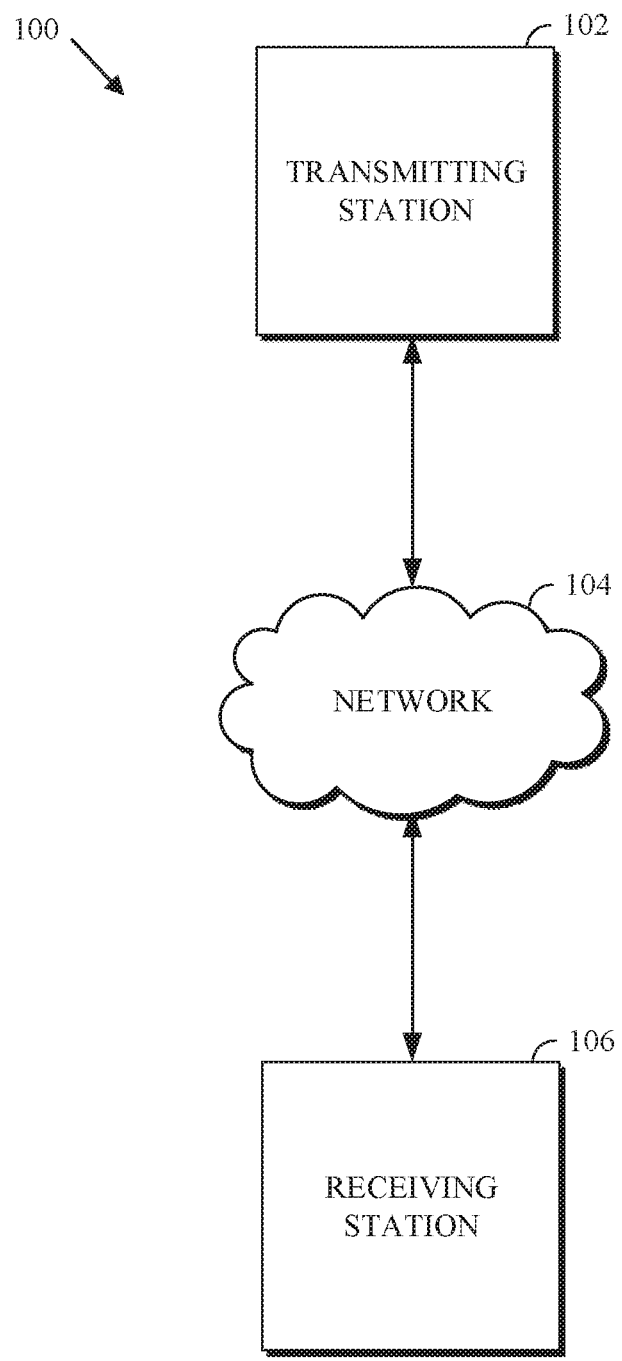
FIG. 1 is a schematic of a video encoding and decoding system.

When blockwise codecs such as JPEG, x264, x265, VP 9, or AV1 are used to compress images (e.g., frames of video) with an unusually low bitrate, blocking artifacts start to emerge more noticeably. Block boundaries are spatially high frequency and form a visual clue that is enhanced in the human retina. Previous strategies to deal with this phenomenon have drawbacks: (1) Strategies of smoothing them after they appear tend to spoil the image slightly, and can remove actual detail that is wanted. (2) Overlapping transforms decode slower, consuming more computing resources (e.g., memory, processor cycles, and battery power). (3) Complicated cross-block prediction makes formats more complicated and do not always produce good results. (4) The discrete sine transform (DST) solves the blocking artifact problem only halfway. The other half of the transform still stays in the air and the next block needs to compensate for it. (5) Higher data rates have been used to reduce the blocking artifacts produced by DCT.

At lower data rates (e.g., higher compression) the blocking artifacts can become the main feature in an image. With the new approach described below, blocking artifacts may be suppressed and one can observe much more details in the image, even at extremely low information densities. This approach can be used to augment existing codecs, such as the current JPEG image format (e.g., by preparing special JPEG images and applying a blurring filter in a browser).

The approach is to: (1) apply a sharpening filter to an input image (e.g., a frame of video or a still image) to obtain a sharpened image; (2) encode the sharpened image using a traditional blockwise encoder (e.g., a DCT based encoder); (3) transmit and/or store the resulting encoded bitstream; (4) decode data from the encoded bitstream using a traditional blockwise decoder (e.g., an inverse DCT based encoder) to obtain a blocked image based on the input image; (5) apply a blurring filter that is matched to sharpening filter (e.g., the blurring filter is an inverse of the sharpening filter) to the blocked filter to obtain an output image. This approach is similar in effect to using a discrete Gabor transform (DGT) in the codec instead of a traditional DCT used in most standard codecs, but with much lower complexity than implementing the DGT based codec. The approach can also be easily utilized with existing standardized codecs, reducing development costs and allowing for backward compatibility.

With this approach, the quantization may happen in a space where errors are more difficult for human eyes to observe. As a result coarser quantization can be used to achieve lower data rates with little effect on subjective image quality. If the same quantization is used, there may be less visible blocking artifacts and higher subjective image quality. This approach can be used with video and still image encoding This approach may have a number of advantages over other methods. For example, better visual quality may be achieved at the same data rate. The augmented codec may be simple to implement as an add-on to existing standardized codecs. Systems using this approach may be compatible with older codecs—only a Gaussian blurring filter needs to be applied as a post-processing with a standard decoder.

Details are described herein after first describing an environment in which the improved image processing for compression disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
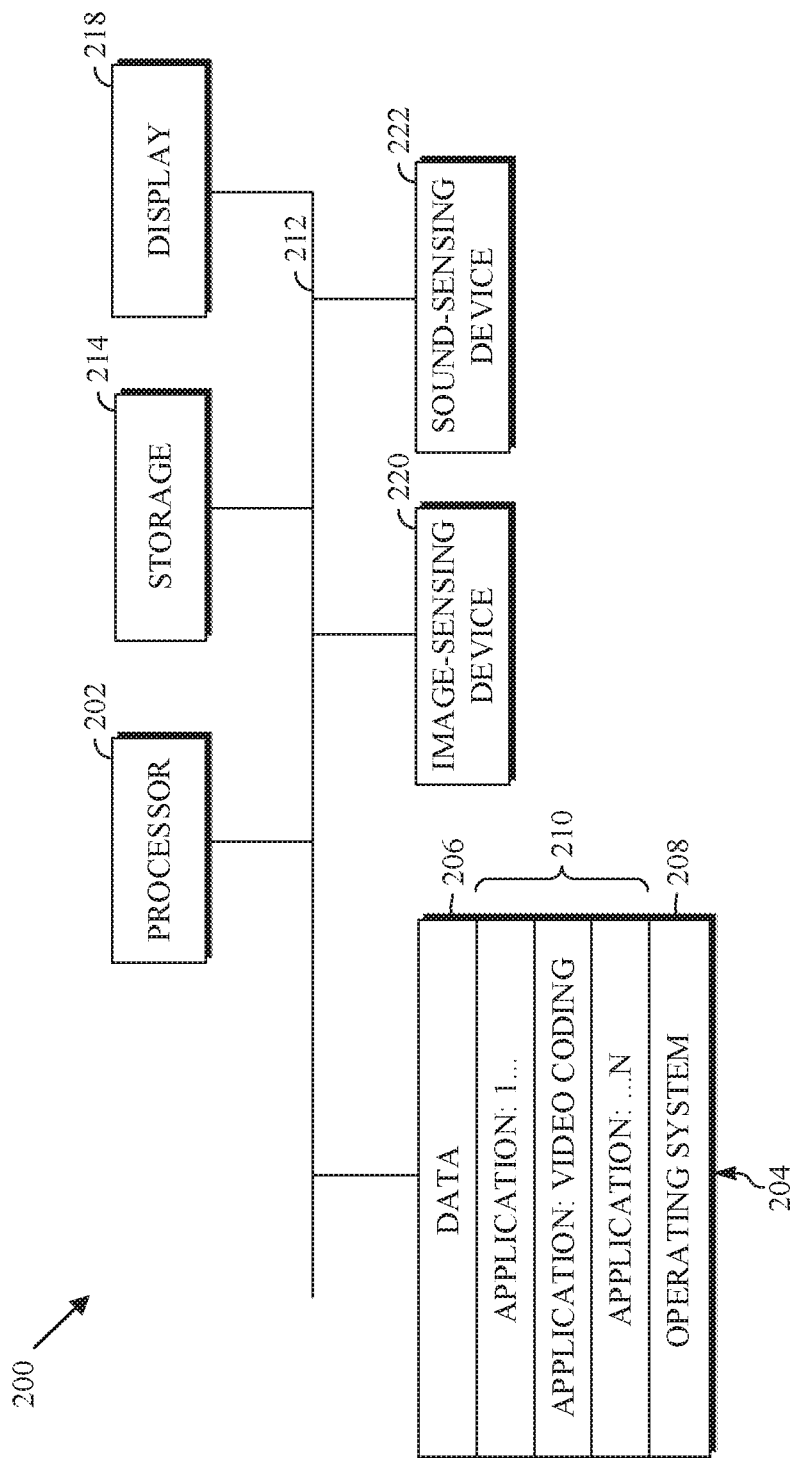
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
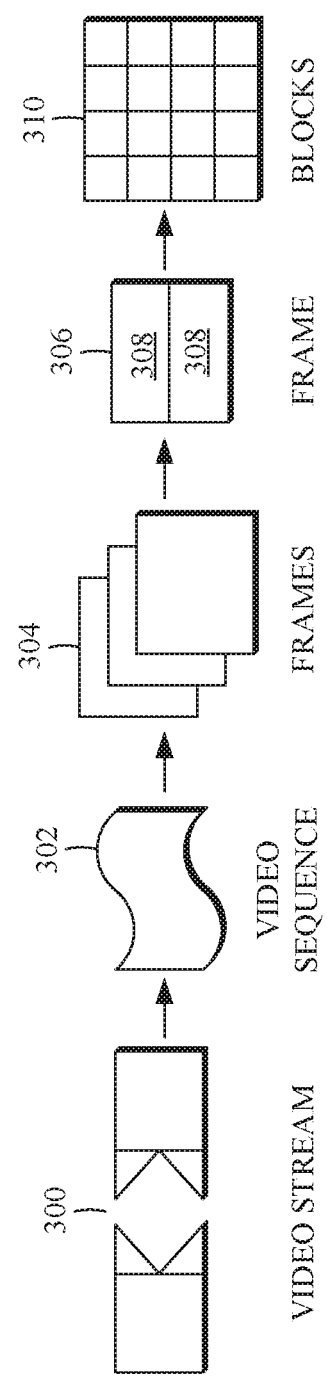
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. In some cases, a frame may be referred to as a picture. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, 4×32 pixels, 8×32 pixels, 16×32 pixels, 32×4 pixels, 32×8 pixels, 32×16 pixels, 32×32 pixels, 64×64 pixels, or in general N×M pixels, where N, M may be an integer power of 2 like 2, 4, 8, 16, 32, 64, 128, 256, or larger.

Figure 4:
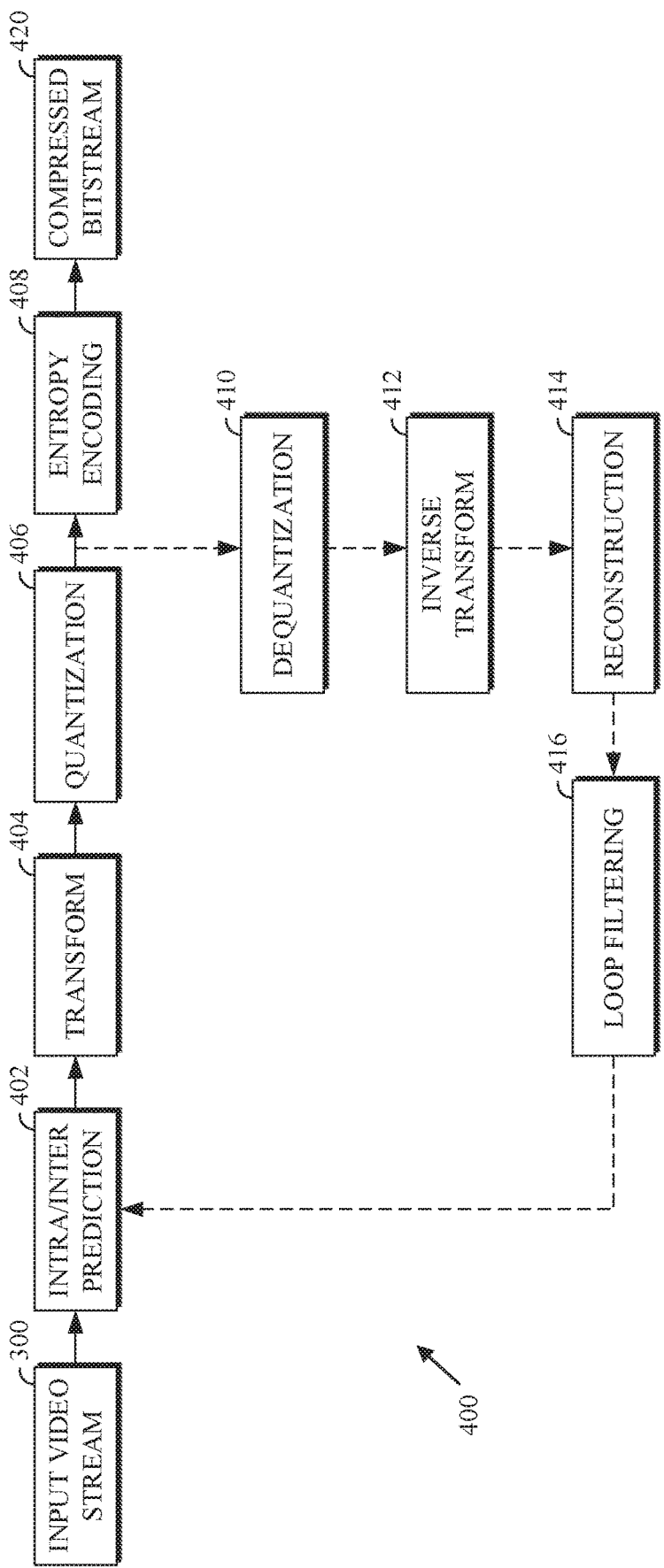
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms (e.g., identity transform, transpose, rotation, and Karhunen-Loève transform (KLT)) are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
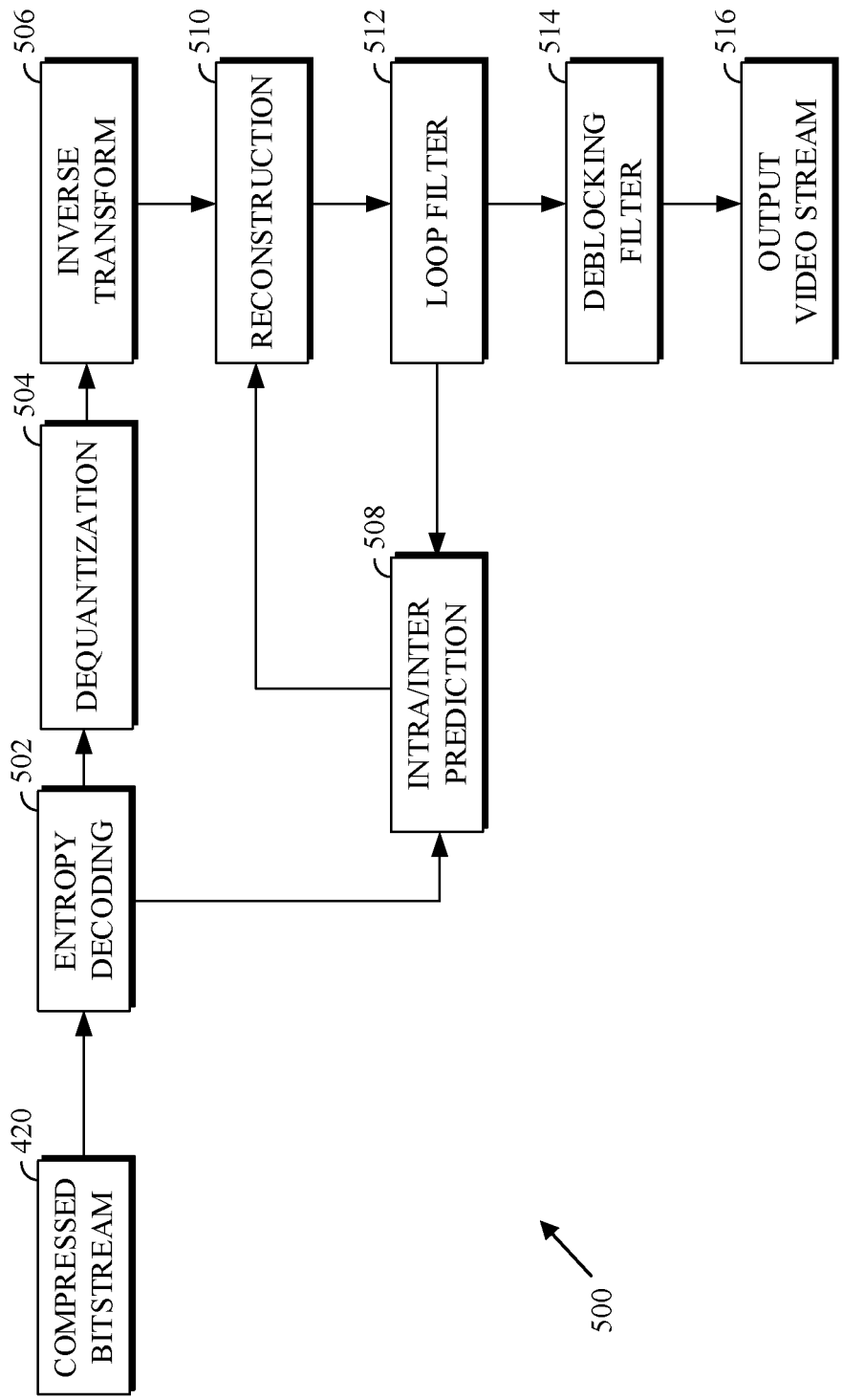
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post-processing stage 514 (e.g., including deblocking filtering). Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering is applied by the post-processing stage 514 to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post-processing stage 514. In some implementations of the decoder 500, the post-processing stage 514 (e.g., including deblocking filtering) is applied before the loop filtering stage 512. Additionally, or alternatively, the encoder 400 includes a deblocking filtering stage in addition to the loop filtering stage 416.

Figure 6:
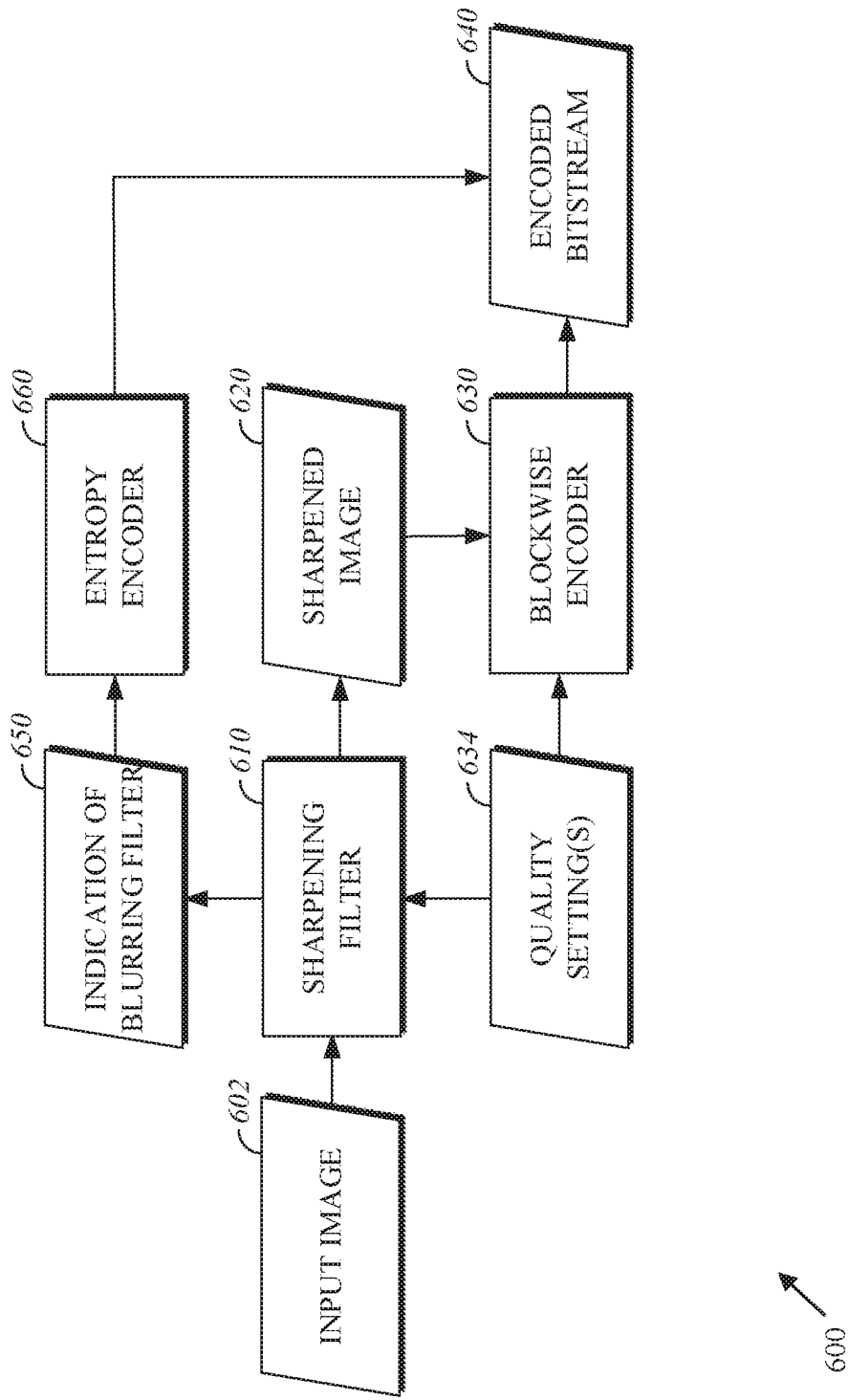
FIG. 6 is a block diagram of an example of a system for encoding images.

FIG. 6 is a block diagram of an example of a system 600 for encoding images. For example, the system 600 may implement the process 800 of FIG. 8. The system 600 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode image data in the manner described herein. The system 600 can also be implemented as specialized hardware included in, for example, the transmitting station 102.

The system 600 takes as input an input image 602 (e.g., a greyscale image or a color image). For example, the input image 602 may be a frame of video. For example, the input image 602 may be a still image.

The input image 602 is passed into a sharpening filter module 610 that applies a sharpening filter to an input image 602 to obtain a sharpened image 620. The sharpened image 620 is passed to a blockwise encoder 630 that is configured to compress and encode the sharpened image 620 in an encoded bitstream 640. For example, the blockwise encoder 630 may be a JPEG encoder, an x264 encoder, an x265 encoder, a VP9 encoder, or an AV1 encoder. For example, the blockwise encoder 630 may include the encoder 400 of FIG. 4, where the sharpened image 620 is a frame of video in the input video stream 300 of FIG. 4. The blockwise encoder 630 may partition the input image 602 into blocks as part of compression and encoding. For example, the blockwise encoder 630 may apply a transform (e.g., a discrete cosine transform (DCT)) to the blocks of the sharpened image 620. A blurring filter that is matched to the sharpening filter applied by the sharpening filter module 610 may be applied to a corresponding decoded image decoded from the encoded bitstream 640 to mitigate high frequency block coding artifacts with little distortion of the original input image 602. For example, the transfer function of the blurring filter may be an approximate inverse of the transfer function of the sharpening filter.

The sharpening filter module 610 generates an indication 650 of the blurring filter that is matched to the applied sharpening filter. For example, the indication 650 of the blurring filter may include a list of blurring filter coefficients. For example, the indication 650 of the blurring filter may include a codebook index that specifies one of a set of blurring filters stored in codebook by a receiving station that is matched to the sharpening filter that was applied. In this example system, the indication 650 of the blurring filter is encoded by an entropy encoder 660 and a resulting compressed indication 650 of the blurring filter is included in the encoded bitstream 640. For example, the compressed indication 650 of the blurring filter may be included in a header portion of the encoded bitstream 640.

The blockwise encoder 630 may be configured based one or more quality settings 634 (e.g., a JPEG quality setting). For example, the one or more quality settings 634 may determine block size used by the blockwise encoder and/or other parameters of the blockwise encoder 630. The one or more quality settings 634 may also be used by the sharpening filter module 610 to determine the sharpening filter and the matched blurring filter that will be used. In some implementations, a quantization matrix of the blockwise encoder 630 may be modified based on the indication 650 of the blurring filter. For example, the quantization matrix of the blockwise encoder 630 may be modified to allocate less bits to frequencies emphasized by the sharpening filter of the sharpening filter module 610.

The sharpening filter module 610 may determine the sharpening filter to be applied the input image 602, and the corresponding matched blurring filter to be used by a receiving station when decoding an image based on the input image 602. In some implementations, sharpening filter and the matched blurring filter are determined by selecting from a codebook of matched pairs of filters. For example, a matched pair of sharpening filter and blurring filter may be selected based on the one or more quality settings 634. In some implementations, the coefficients of the sharpening filter and the blurring filter are determined by searching for coefficients resulting in low end-to-end distortion to the input image 602. For example, a gradient descent search algorithm (e.g., using an end-to-end square error cost function) may be employed to determine coefficients of the sharpening filter and the blurring filter. In some implementations, the blurring filter has a smaller kernel size than the sharpening filter. For example, the blurring filter may have coefficients from the array 1000 of FIG. 10A, and the sharpening filter may have coefficients from the array 1050 of FIG. 10B. For example, the blurring filter may have coefficients from the array 1100 of FIG. 10A, and the sharpening filter may have coefficients from the array 1150 of FIG. 10B.

Figure 7:
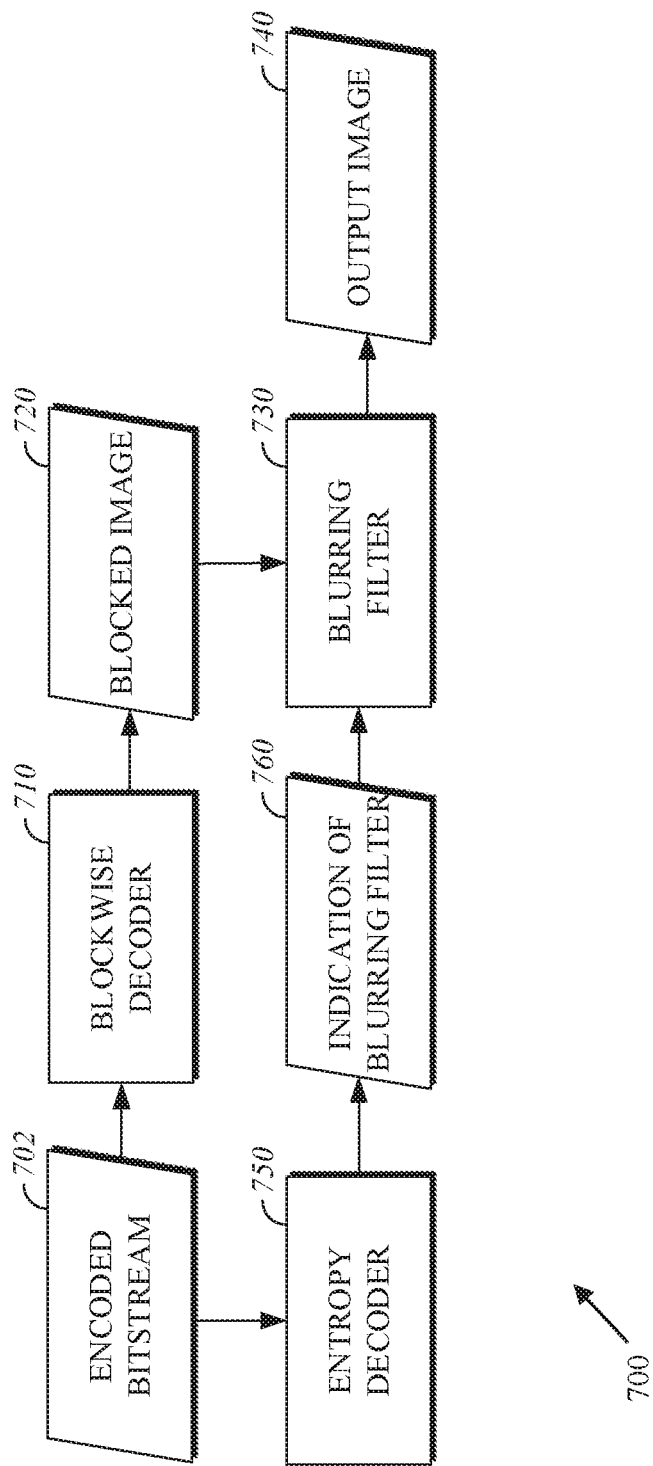
FIG. 7 is a block diagram of an example of a system for decoding images.

FIG. 7 is a block diagram of an example of a system 700 for decoding images. The system 700 is configured to decode an encoded bitstream 702 that has been encoded by the system 600 of FIG. 6. For example, the system 700 may implement the process 900 of FIG. 9. The system 700 can be implemented in the receiving station 106, for example, by providing a computer software program stored in the memory 204. The computer software program can include machine instructions that, when executed by a processor such as the CPU 202, cause the receiving station 106 to decode image data in the manner described herein. The system 700 can also be implemented in hardware included in, for example, the transmitting station 102 or the receiving station 106.

The system 700 takes as input the encoded bitstream 702 and outputs an output image 740 that closely approximates an input image (e.g., the input image 602) that was encoded by the corresponding encoding system (e.g., the system 600). For example, the output image 740 may be a frame of video. For example, the output image 740 may be a still image. For example, a receiving station (e.g., the receiving station 106) implementing the system 700 may store, display, or transmit the output image 740.

The system 700 includes a blockwise decoder 710 that is configured to decode data from an encoded bitstream 702 to obtain a plurality of blocks of image data that are combined to form a blocked image 720. For example, the blockwise decoder 710 may be a JPEG decoder, an x264 decoder, an x265 decoder, a VP9 decoder, or an AV1 decoder. For example, the blockwise decoder 710 may apply an inverse transform (e.g., an inverse discrete cosine transform (DCT)) to the blocks of the blocked image 720. For example, the blockwise decoder 710 may include the decoder 500 of FIG. 5, where the blocked image 720 is a frame of video in the output video stream 516 of FIG. 5. The blocked image 720 may exhibit blocking artifacts that include high frequency distortion of an input image (e.g., the input image 602) that was encoded by the corresponding encoding system (e.g., the system 600).

The blocked image 720 is passed into a blurring filter module 730 that applies a blurring filter to the blocked image 720 to obtain the output image 740 (e.g., a frame of video or a still image). The blurring filter may be matched to a sharpening filter (e.g., the sharpening filter of the sharpening filter module 610) that was applied to a corresponding input image (e.g., the input image 602) encoded in the encoded bitstream 702. By matching the sharpening filter that was applied prior to encoding, the blurring filter may serve to mitigate high frequency block coding artifacts with little distortion of the original input image (e.g., the input image 602). For example, the transfer function of the blurring filter may be an approximate inverse of the transfer function of the sharpening filter. In some implementations, the blurring filter has a smaller kernel size than the matched sharpening filter, which may facilitate low complexity receiving stations. In some implementations, the blurring filter of the blurring filter module 730 is applied to a luminance channel of the blocked image 720 to obtain a luminance channel of the output image 740. In some implementations, the blurring filter of the blurring filter module 730 is applied to a plurality of channels of the blocked image 720 to obtain the output image 740. For example, the blurring filter may have coefficients from the array 1000 of FIG. 10A, and the corresponding sharpening filter may have coefficients from the array 1050 of FIG. 10B. For example, the blurring filter may have coefficients from the array 1100 of FIG. 10A, and the corresponding sharpening filter may have coefficients from the array 1150 of FIG. 10B.

The system 700 includes an entropy decoder 750 for decoding a data from the encoded bitstream 702 to obtain an indication 760 of the blurring filter that will be applied by the blurring filter module 730. For example, the indication 760 of the blurring filter may include a list of blurring filter coefficients. For example, the indication 760 of the blurring filter may include a codebook index that specifies one of a set of blurring filters stored in codebook by a receiving station that is matched to a sharpening filter (e.g., the sharpening filter of the sharpening filter module 610) that was applied during encoding. In some implementations, the indication 760 of the blurring filter includes an image quality setting (e.g., a JPEG quality setting) of the encoded bitstream 702. For example, the blurring filter of the blurring filter module 730 may be selected from a set of available blurring filters (e.g., stored in a receiving station codebook) based on the indication of the image quality setting of the encoded bitstream 702.

In some implementations, a quantization matrix of the blockwise decoder 710 may be modified based on the indication 760 of the blurring filter. For example, the quantization matrix of the blockwise decoder 710 may be modified to match a modification to a quantization matrix used during encoding of the encoded bitstream 702 and/or to allocate more bits to frequencies emphasized by the blurring filter.

Figure 8:
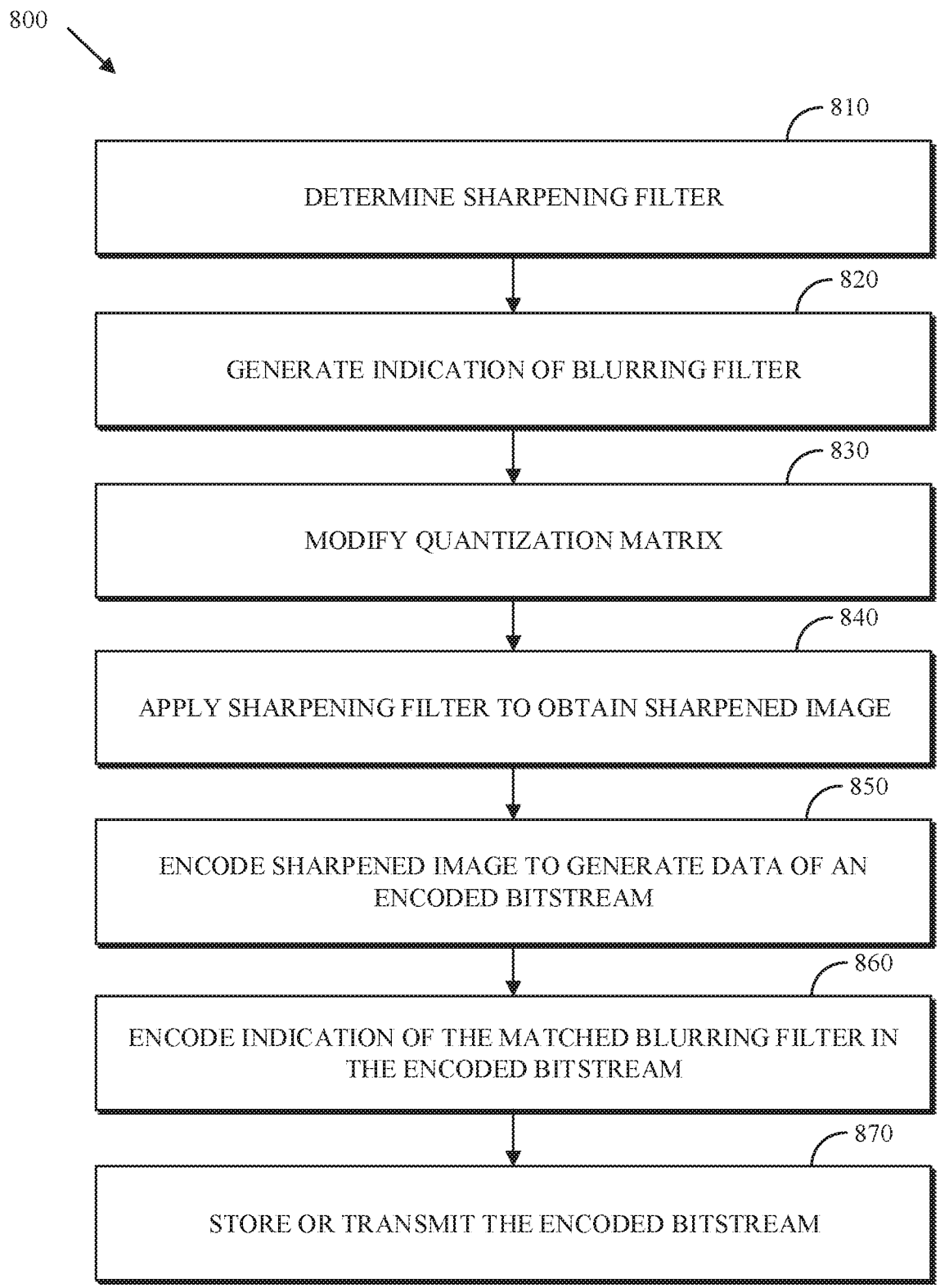
FIG. 8 is a flowchart of an example of a process for encoding an image.

FIG. 8 is a flowchart of an example of a process 800 for encoding an image. The process includes determining 810 a sharpening filter; generating 820 an indication of a blurring filter matched to the sharpening filter; modifying 830 a quantization matrix of a blockwise encoder; applying 840 the sharpening filter to an input image to obtain a sharpened image; encoding 850 the sharpened image to generate data of an encoded bitstream; encoding 860 the indication of the matched blurring filter in the encoded bitstream; and storing or transmitting 870 the encoded bitstream. For example, the process 800 may be implemented by the system 600 of FIG. 6. For example, the process 800 may be implemented by the computing device 200 of FIG. 2. For example, the process 800 may be implemented by the transmitting station 102 of FIG. 1.

The process 800 includes determining 810 the sharpening filter. In some implementations, determining 810 the sharpening filter includes determining 810 coefficients of the sharpening filter and the blurring filter by searching for coefficients resulting in low end-to-end distortion to the input image. For example, a gradient descent search algorithm (e.g., using an end-to-end square error cost function) may be employed to determine 810 coefficients of the sharpening filter and the blurring filter. In some implementations, the blurring filter has a smaller kernel size than the sharpening filter. For example, a space of Guassian blurring filters (e.g., with standard deviations in the range of 0.8 to 1.5 pixels) with matched sharpening filters (e.g., sharpening filters with transfer functions that are approximate inverses of respective blurring filters) may be searched in this manner. In some implementations, the sharpening filter is selected, based on an image quality setting (e.g., a JPEG quality setting) of a blockwise encoder, from a set of available sharpening filters (e.g., a set of sharpening filters with matched blurring filters stored in a codebook by a receiving station). For example, how much blurring is appropriate may depend on the block size used by the blockwise encoder when it encodes the sharpened image obtained by applying the sharpening filter to an input image.

The process of deriving the sharpening filter from desired blurring filter can be posed as a particular kind of deconvolution. For example, the blurring filter may be first determined a Gaussian filter with standard deviation (sigma) determined based on a selected image quality level. The sharpening filter may then be determined 810 as an inverse of the blurring filter. Note that this process can be image-independent. The matched sharpening filter can be determined 810 by solving for coefficients of the sharpening filter that minimize $L2(I-B(S(I)))$; where $L2(x)$ is the sum of squares of all values in an image x, and I is an all-zeros image with a single value 1.0 in the center; $B(x)$ applies the blurring filter to an image x, and $S(x)$ applies the sharpening filter to an image x. This involves fitting a linear function to minimize mean square error. For example, this can be solved using a conjugate gradient method to determine 810 the sharpening filter.

The process 800 includes generating an indication of the blurring filter that is matched to the determined 810 sharpening filter. For example, the indication of the blurring filter may include a list of blurring filter coefficients. In some implementations, the indication of the blurring filter includes a codebook index that specifies one of a set of blurring filters stored in codebook by a receiving station that is matched to the determined 810 sharpening filter. In some implementations, (e.g., where a quality setting of the blockwise encoder is used to determine 810 the sharpening filter) a quality setting of the blockwise encoder serves as the indication of the blurring filter. The quality setting (e.g., a JPEG quality setting) may be generated or received from a user or another system.

The process 800 includes modifying 830 a quantization matrix of the blockwise encoder based on the indication of the blurring filter. For example, the quantization matrix of the blockwise encoder may be modified 830 to allocate more bits to frequencies emphasized by the blurring filter. For example, the quantization matrix of the blockwise encoder may be modified 830 to allocate less bits to frequencies emphasized by the sharpening filter of the sharpening filter module 610.

The process 800 includes applying 840 the sharpening filter to an input image to obtain a sharpened image. The sharpening filter is matched to the blurring filter. For example, the transfer function of the blurring filter may be an approximate inverse of the transfer function of the sharpening filter. For example, the blurring filter may have coefficients from the array 1000 of FIG. 10A, and the sharpening filter may have coefficients from the array 1050 of FIG. 10B. For example, the blurring filter may have coefficients from the array 1100 of FIG. 10A, and the sharpening filter may have coefficients from the array 1150 of FIG. 10B. The input image may be a grayscale image or a color image with multiple color channels (e.g., red, green, blue, or a luminance channel and chrominance channels). For example, the input image may be a frame of video. For example, the input image may be a still image. For example, the sharpening filter may be applied 840 by convolving an impulse response of the sharpening filter with the input image.

The process 800 includes encoding 850, using a blockwise encoder (e.g., the blockwise encoder 630), the sharpened image to generate data of an encoded bitstream. For example, the blockwise encoder may be a JPEG encoder, an x264 encoder, an x265 encoder, a VP9 encoder, or an AV1 encoder. For example, the blockwise encoder may include the encoder 400 of FIG. 4, where the sharpened image is a frame of video in the input video stream 300 of FIG. 4. The blockwise encoder may partition the input image into blocks as part of compression and encoding. For example, the blockwise encoder may apply a transform (e.g., a discrete cosine transform (DCT)) to the blocks of the sharpened image.

The process 800 includes encoding 860 the indication of the blurring filter in the encoded bitstream. For example, the indication of the blurring filter may be encoded 860 by an entropy encoder and a resulting compressed indication of the blurring filter may be included in the encoded bitstream. In some implementations, the indication of the blurring filter may be encoded 860 multiplexing or inserting the indication, without compression) into a position in the encoded bitstream. For example, the indication of the blurring filter (compressed or uncompressed) may be encoded 860 in a header portion of the encoded bitstream.

The process 800 includes storing or transmitting 870 the encoded bitstream. For example, the encoded bitstream may be stored 870 in the secondary storage 214 or the memory 204. For example, the encoded bitstream may be transmitted 870 via a network interface from the transmitting station 102, through the network 104, to the receiving station 106.

Figure 9:
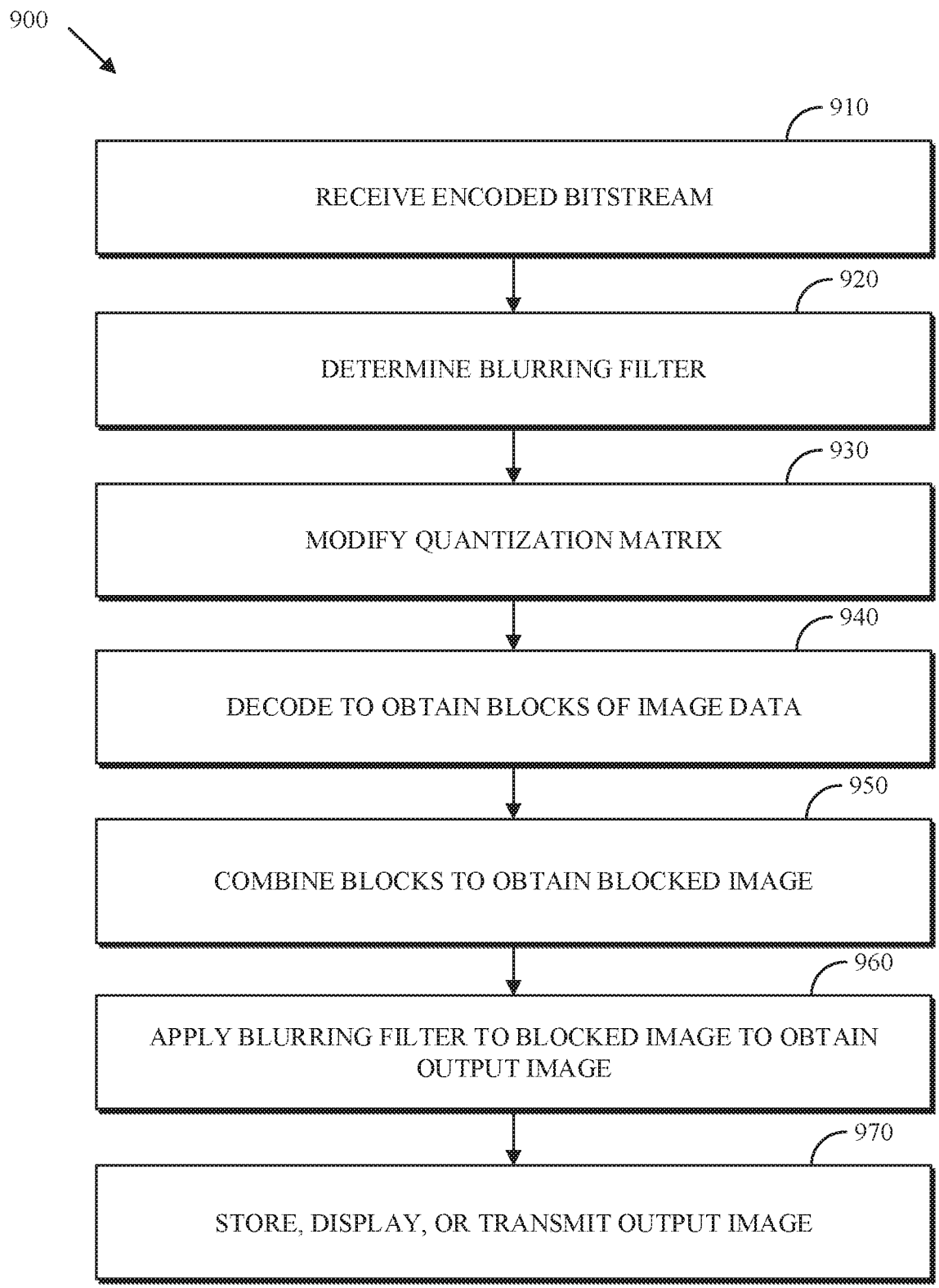
FIG. 9 is a flowchart of an example of a process for decoding an image.

FIG. 9 is a flowchart of an example of a process 900 for decoding an image. The process 900 includes receiving 910 an encoded bitstream; determining 920 a blurring filter; modifying 930 a quantization matrix of a blockwise decoder; decoding 940 data from the encoded bitstream to obtain blocks of image data; combining 950 the blocks of image data to obtain a blocked image; applying 960 the blurring filter to the blocked image to obtain an output image; and storing, displaying, or transmitting the output image. For example, the process 900 may be implemented by the system 700 of FIG. 7. For example, the process 900 may be implemented by the computing device 200 of FIG. 2. For example, the process 900 may be implemented by the receiving station 106 of FIG. 1.

The process 900 includes receiving 910 an encoded bitstream that was generated at least in part by applying a sharpening filter to an input image to obtain a sharpened image and applying a blockwise encoder to the sharpened image. For example, the encoded bitstream may be received via a network interface at the receiving station 106, through the network 104, from the transmitting station 102.

The process 900 includes determining 920 a blurring filter that is matched to the sharpening filter. For example, determining 920 the blurring filter may include decoding data from the encoded bitstream to obtain the blurring filter. In some implementations, a list of blurring filter coefficients may be decoded from the encoded bitstream to determine 920 the blurring filter. In some implementations, a codebook index is decoded from the encoded bitstream to determine 920 the blurring filter. The codebook index may specify one of a set of blurring filters stored in codebook by a receiving station that is matched to a sharpening filter that was applied during encoding. For example, the blurring filter may be determined 920 by selecting, based on an indication of an image quality setting (e.g., a JPEG quality setting) of the encoded bitstream, the blurring filter from a set of available blurring filters. The same image quality setting may have been used by a transmitting station to selecting a matching sharpening filter from a matching set of available sharpening filters.

The process 900 includes modifying 930 a quantization matrix of the blockwise decoder based on an indication of the blurring filter. For example, the quantization matrix of the blockwise decoder may be modified 930 to match a modification to a quantization matrix used during encoding of the encoded bitstream and/or to allocate more bits to frequencies emphasized by the blurring filter. In some implementations, the quantization matrix is modified 930 using parameters stored in a table indexed by a codebook index that is also used to determine 920 the blurring filter.

The process 900 includes decoding 940, using a blockwise decoder (e.g., the blockwise decoder 710), data from an encoded bitstream to obtain a plurality of blocks of image data. For example, the blockwise decoder may be a JPEG decoder, an x264 decoder, an x265 decoder, a VP9 decoder, or an AV1 decoder. For example, the blockwise decoder may apply an inverse transform (e.g., an inverse discrete cosine transform (DCT)) to the blocks of image data.

The process 900 includes combining 950 the plurality of blocks of image data to form a blocked image. The blocked image may exhibit blocking artifacts that include high frequency distortion of the input image that was encoded in the encoded bitstream. The blocks may be combined 950 by the blockwise decoder (e.g., the blockwise decoder 710). For example, the blockwise decoder may include the decoder 500 of FIG. 5, where the blocked image is a frame of video in the output video stream 516 of FIG. 5.

The process 900 includes applying 960 the blurring filter, which is matched to the sharpening filter, to the blocked image to obtain an output image. By matching the sharpening filter that was applied prior to encoding, the blurring filter may serve to mitigate high frequency block coding artifacts with little distortion of the original input image (e.g., the input image 602). For example, the transfer function of the blurring filter may be an approximate inverse of the transfer function of the sharpening filter. In some implementations, the blurring filter has a smaller kernel size than the sharpening filter, which may facilitate low complexity receiving stations. In some implementations, the blurring filter is applied 960 to a luminance channel of the blocked image to obtain a luminance channel of the output image. In some implementations, the blurring filter is applied 960 to a plurality of channels of the blocked image to obtain the output image. For example, the blurring filter may have coefficients from the array 1000 of FIG. 10A, and the corresponding sharpening filter may have coefficients from the array 1050 of FIG. 10B. For example, the blurring filter may have coefficients from the array 1100 of FIG. 10A, and the corresponding sharpening filter may have coefficients from the array 1150 of FIG. 10B. The output image may be a grayscale image or a color image with multiple color channels (e.g., red, green, blue, or a luminance channel and chrominance channels). For example, the output image may be a frame of video. For example, the output image may be a still image. For example, the blurring filter may be applied 960 by convolving an impulse response of the blurring filter with the blocked image.

The process 900 includes storing, displaying, or transmitting 970 the output image. For example, the output image may be stored 970 in the secondary storage 214 or the memory 204. For example, the output image may be displayed 970 on the display 218. For example, the output image may be transmitted 970, via a network interface or serial port (e.g., a High-Definition Multimedia Interface (HDMI)), to another device for display.

FIG. 10A is an example of an array 1000 of coefficients of a blurring filter. The array 1000 specifies a 5×5 pixel kernel for the blurring filter. The blurring filter of array 1000 is a Guassian filter with a standard deviation (sigma) of 0.8. For example, the array 1000 may be stored in a codebook in a receiving station (e.g., the receiving station 106) and applied to blocked images decoded with JPEG quality setting of 20.

FIG. 10B is an example of an array 1050 of coefficients of a sharpening filter. The array 1050 specifies a 9×9 pixel kernel for the sharpening filter. The sharpening filter of the array 1050 is matched to the blurring filter of the array 1000. The sharpening filter of the array 1050 is an approximate inverse (in terms of minimal mean square error) of the blurring filter of the array 1000.

For example, an input image may be encoded by: (1) applying (convolving with) the sharpening filter of the array 1050 to obtain a sharpened image; and (2) encoding the sharpened image using a JPEG encoder with quality setting equal to 20. The corresponding decoding steps are: (1) decoding using a JPEG decoder; and (2) applying (convolving with) the blurring filter of the array 1000 to obtain an output image that has low distortion with respect to the input image.

Figure 11B:
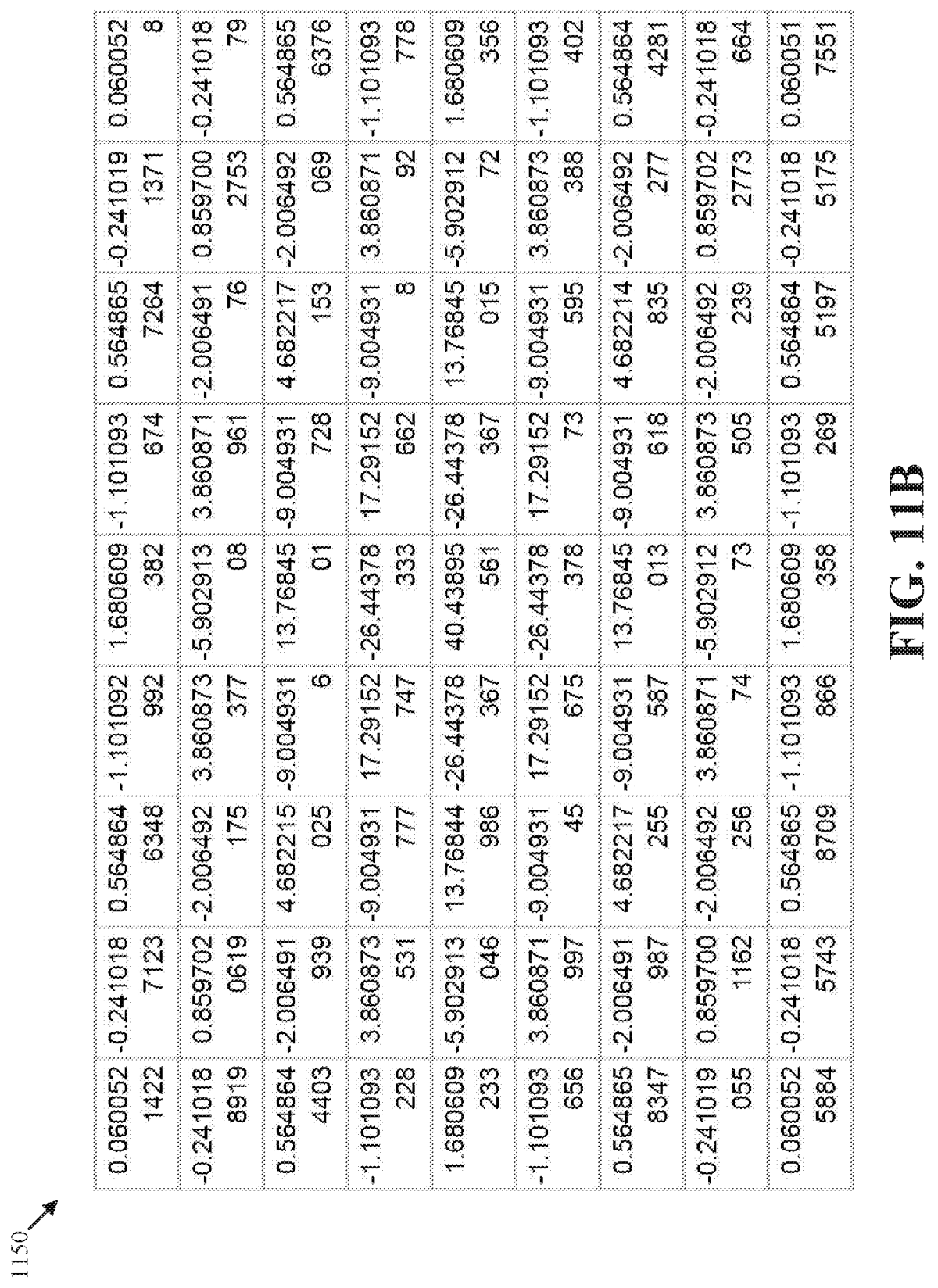

FIG. 11A is an example of an array 1100 of coefficients of a blurring filter. The array 1100 specifies a 5×5 pixel kernel for the blurring filter. The blurring filter of array 1100 is a Guassian filter with a standard deviation (sigma) of 0.9. For example, the array 1100 may be stored in a codebook in a receiving station (e.g., the receiving station 106) and applied to blocked images decoded with JPEG quality setting of 15. The blurring filter of FIG. 11A uses a larger standard deviation than the blurring filter of FIG. 11B in order to compensate for more high frequency blocking artifacts that may occur when the lower quality setting (i.e., 15 versus 20) is used for the encoding scheme.

FIG. 11B is an example of an array 1150 of coefficients of a sharpening filter. The array 1150 specifies a 9×9 pixel kernel for the sharpening filter. The sharpening filter of the array 1150 is matched to the blurring filter of the array 1100. The sharpening filter of the array 1150 is an approximate inverse (in terms of minimal mean square error) of the blurring filter of the array 1100.

For example, an input image may be encoded by: (1) applying (convolving with) the sharpening filter of the array 1150 to obtain a sharpened image; and (2) encoding the sharpened image using a JPEG encoder with quality setting equal to 15. The corresponding decoding steps are: (1) decoding using a JPEG decoder; and (2) applying (convolving with) the blurring filter of the array 1100 to obtain an output image that has low distortion with respect to the input image.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A system for decoding images, comprising:
a memory; and
a processor, wherein the memory stores instructions executable by the processor to cause the system to:
receive an encoded bitstream that was generated at least in part by applying a pixel-domain sharpening filter to an input image to obtain a sharpened image and applying a blockwise encoder to the sharpened image,
wherein the pixel-domain sharpening filter was applied to the input image by the blockwise encoder before the blockwise encoder applied a transform to the sharpened image;
decode, using a blockwise decoder, data from the encoded bitstream to obtain a plurality of blocks of image data;
combine the plurality of blocks of image data to form a blocked image; and apply a pixel-domain blurring filter, which is matched to the pixel-domain sharpening filter, to the blocked image to obtain an output image.

2. The system of claim 1, wherein the pixel-domain blurring filter has a smaller kernel size than the pixel-domain sharpening filter.

3. The system of claim 1, wherein the memory stores instructions executable by the processor to cause the system to:
select, based on an indication of an image quality setting of the encoded bitstream, the pixel-domain blurring filter from a set of available blurring filters.

4. The system of claim 1, wherein the memory stores instructions executable by the processor to cause the system to:
decode data from the encoded bitstream to obtain the pixel-domain blurring filter.

5. The system of claim 1, wherein the memory stores instructions executable by the processor to cause the system to:
modify a quantization matrix of the blockwise decoder based on an indication of the pixel-domain blurring filter.

6. The system of claim 1, wherein the pixel-domain blurring filter is applied to a first luminance channel of the blocked image to obtain a second luminance channel of the output image.

7. The system of claim 1, wherein the pixel-domain blurring filter is applied to a plurality of channels of the blocked image to obtain the output image.

8. The system of claim 1, wherein the memory stores instructions executable by the processor to cause the system to:
store, display, or transmit the output image.

9. The system of claim 1, wherein the blockwise decoder is a JPEG decoder.

10. The system of claim 1, wherein the output image is a frame of video.

11. A method for decoding images comprising:
receiving an encoded bitstream that was generated at least in part by applying a pixel-domain sharpening filter to an input image to obtain a sharpened image and applying a blockwise encoder to the sharpened image,
wherein the pixel-domain sharpening filter was applied to the input image by the blockwise encoder before the blockwise encoder applied a transform to the sharpened image;
decoding, using a blockwise decoder, data from the encoded bitstream to obtain a plurality of blocks of image data;
combining the plurality of blocks of image data to form a blocked image; and
applying a pixel-domain blurring filter, which is matched to the pixel-domain sharpening filter, to the blocked image to obtain an output image.

12. The method of claim 11, wherein the pixel-domain blurring filter has a smaller kernel size than the pixel-domain sharpening filter.

13. The method of claim 11, comprising:
selecting, based on an indication of an image quality setting of the encoded bitstream, the pixel-domain blurring filter from a set of available blurring filters.

14. The method of claim 11, comprising:
decoding data from the encoded bitstream to obtain the pixel-domain blurring filter.

15. The method of claim 11, comprising:
modifying a quantization matrix of the blockwise decoder based on an indication of the pixel-domain blurring filter.

16. A system for encoding images, comprising:
a memory; and
a processor, wherein the memory stores instructions executable by the processor to cause the system to:
apply, before applying a transform to an input image, a pixel-domain sharpening filter to the input image to obtain a sharpened image, wherein the pixel-domain sharpening filter is matched to a pixel-domain blurring filter;
encode, after applying the pixel-domain sharpening filter and using a blockwise encoder, the sharpened image to generate data of an encoded bitstream; and
encode an indication of the pixel-domain blurring filter in the encoded bitstream.

17. The system of claim 16, wherein the memory stores instructions executable by the processor to cause the system to:
determine coefficients of the pixel-domain sharpening filter and the pixel-domain blurring filter by searching for coefficients resulting in low end-to-end distortion to the input image.

18. The system of claim 16, wherein the pixel-domain blurring filter has a smaller kernel size than the pixel-domain sharpening filter.

19. The system of claim 16, wherein the memory stores instructions executable by the processor to cause the system to:
select, based on an image quality setting of the blockwise encoder, the pixel-domain sharpening filter from a set of available sharpening filters.

20. The system of claim 16, wherein the memory stores instructions executable by the processor to cause the system to:
modify a quantization matrix of the blockwise encoder based on the indication of the pixel-domain blurring filter.

* * * * *